(12) United States Patent
Brueck et al.

(10) Patent No.: US 9,623,373 B2
(45) Date of Patent: *Apr. 18, 2017

(54) ELECTRICALLY HEATABLE HONEYCOMB BODY ASSEMBLY HAVING AN ELECTRICAL CONNECTION OF A PLURALITY OF SHEET METAL LAYERS

(71) Applicant: EMITEC GESELLSCHAFT FUER EMISSIONSTECHNOLOGIE MBH, Lohmar (DE)

(72) Inventors: Rolf Brueck, Bergisch Gladbach (DE); Ferdi Kurth, Mechernich (DE); Peter Hirth, Roesrath (DE); Thomas Haerig, Neunkirchen-Seelscheid (DE)

(73) Assignee: EMITEC Gesellschaft fuer Emissionstechnologie mbH, Lohmar (DE)

(*) Notice: Subject to any disclaimer, the term of this patent is extended or adjusted under 35 U.S.C. 154(b) by 369 days.

This patent is subject to a terminal disclaimer.

(21) Appl. No.: 14/506,809

(22) Filed: Oct. 6, 2014

(65) Prior Publication Data

US 2015/0030509 A1   Jan. 29, 2015

Related U.S. Application Data

(63) Continuation of application No. PCT/EP2013/057009, filed on Apr. 3, 2013.

(30) Foreign Application Priority Data

Apr. 5, 2012  (DE) .................. 10 2012 007 020

(51) Int. Cl.
  *F01N 3/20* (2006.01)
  *F01N 3/28* (2006.01)
  *B01D 53/86* (2006.01)

(52) U.S. Cl.
  CPC ....... *B01D 53/8678* (2013.01); *F01N 3/2026* (2013.01); *F01N 3/281* (2013.01);
  (Continued)

(58) Field of Classification Search
  USPC ............................................. 422/174; 60/300
  See application file for complete search history.

(56) References Cited

U.S. PATENT DOCUMENTS 5,411,711 A   5/1995  Swars
5,768,889 A   6/1998  Maus et al.
(Continued)

FOREIGN PATENT DOCUMENTS

EP   1967712 A2   9/2008
GB   2313559 A   12/1997
(Continued)

*Primary Examiner* — Walter D Griffin
*Assistant Examiner* — Jelitza Perez
(74) *Attorney, Agent, or Firm* — Laurence A. Greenberg; Werner H. Stemer; Ralph E. Locher

(57) ABSTRACT

An electrically heatable honeycomb body assembly includes an electrical connection of sheet metal layers at a connection pin. A honeycomb body has a metal casing with an inner periphery, through which the connection pin is led in a bushing and electrically insulated. The sheet metal layers are alternately coarsely structured and finely structured or smooth sheets together forming a stack with uppermost and lowermost layers and channels for an axial gas flow between the layers. The connection pin runs radially approximately perpendicular to the layers and is metallically connected to at least two or all of the layers through at least one intermediate piece. The uppermost sheet metal layer preferably runs approximately parallel to the metal casing over at least 35% of the inner periphery and is separated there- (Continued)

from only by an air gap. Simple production of an operationally safe and very uniformly electrically heatable honeycomb body is provided.

14 Claims, 3 Drawing Sheets

(52) U.S. Cl.
 CPC ...... *B01D 2255/90* (2013.01); *F01N 2330/02* (2013.01); *F01N 2330/321* (2013.01); *F01N 2330/42* (2013.01); *F01N 2330/44* (2013.01); *Y02T 10/26* (2013.01)

(56) References Cited

U.S. PATENT DOCUMENTS

| | | |
|---|---|---|
| 5,865,864 A | 2/1999 | Brück |
| 8,761,586 B2 | 6/2014 | Brück |
| 2008/0217315 A1* | 9/2008 | Bruck .................. B01J 35/0033 219/162 |
| 2011/0120069 A1 | 5/2011 | Maus et al. |

FOREIGN PATENT DOCUMENTS

| | | |
|---|---|---|
| JP | H0576530 A | 3/1993 |
| KR | 0165689 B1 | 12/1998 |
| KR | 20110013505 A | 2/2011 |
| WO | 9202714 A1 | 2/1992 |
| WO | 9610127 A1 | 4/1996 |

\* cited by examiner

ELECTRICALLY HEATABLE HONEYCOMB BODY ASSEMBLY HAVING AN ELECTRICAL CONNECTION OF A PLURALITY OF SHEET METAL LAYERS

CROSS-REFERENCE TO RELATED APPLICATION

This is a continuation, under 35 U.S.C. §120, of copending International Application No. PCT/EP2013/057009, filed Apr. 3, 2013, which designated the United States; this application also claims the priority, under 35 U.S.C. §119, of German Patent Application DE 10 2012 007 020.9, filed Apr. 5, 2012; the prior applications are herewith incorporated by reference in their entirety.

BACKGROUND OF THE INVENTION

Field of the Invention

The present invention relates to an electrically heatable honeycomb body assembly having an electrical connection of a plurality of sheet metal layers. The invention is in the field of electrically heatable honeycomb bodies, in particular for exhaust-gas treatment systems of internal combustion engines, preferably in motor vehicles. Electrically heatable honeycomb bodies are required, for example, in order to heat components in an exhaust-gas cleaning system in order to thereby reach or maintain a specific minimum temperature for specific chemical reactions, in particular also for catalytically activated reactions. They are employed, for example, in exhaust-gas catalytic converters, particle filters and/or systems for reducing nitrous oxides.

A typical construction of an electrically heatable honeycomb body of that kind is described, for example, in International Publication No. WO 96/10127, corresponding to U.S. Pat. No. 5,768,889. European Patent EP 1 967 712 B1, corresponding to U.S. Pat. No. 8,761,586, also shows the structure of an electrically heatable honeycomb body. Both documents allow an electrically heatable honeycomb body of that kind to be supported (in an electrically insulated manner) on an adjacent honeycomb body.

In order to be able to provide an ohmic resistance which is high enough for electrical heating, electrically heatable honeycomb bodies of that kind include at least one stack of a plurality of sheet metal layers which are constructed in such a way that they form channels through which a gas can flow in an axial direction. Coarsely structured metal sheets and finely structured and/or smooth metal sheets are typically layered alternately one on top of the other for that purpose. Due to the stack being intertwined in an opposite direction in the shape of an S, a U or the like, the stack is formed in such a way that it fills a round or oval cross section, wherein adjacent turns of the stack have to be electrically insulated from one another. The insulation can be achieved by using insulating layers and/or by using electrically insulating air gaps. Air gaps in the case of intensive thermal expansions in the metal sheets/stacks during operation can be stabilized by virtue of the turns of the stack being fastened to an adjacent honeycomb body by using supporting pins and as a result being secured in their position. In that way, it is also possible to stabilize relatively short electrically heatable honeycomb bodies, for example honeycomb bodies with an axial extension of only 1 to 5 cm, in the axial direction.

It has been found that it is advantageous for the stability and/or the electrical properties of an electrically heatable honeycomb body to construct the electrically heatable honeycomb body from alternating coarsely structured sheet metal layers and finely structured sheet metal layers, in particular from sheet metal layers with a fine first corrugation (having a small first corrugation height and a small first corrugation length) and from sheet metal layers with a coarse second structure (with a second corrugation having a large second corrugation height and/or a large second corrugation length). The sheet metal layers within a stack are preferably brazed to one another at some (selected) or all contact points or fastened to one another by diffusion connections.

However, the electrical connection of the stack to an external current source constitutes a technical problem. Since it is necessary to place the intertwined electrically conductive stack in the interior of a metal casing tube, at least one supply line to the stack is required. The supply line is electrically insulated from the casing tube and current strengths of such high magnitude are typically intended to be conducted through the stack that it is desirable to distribute the current in as uniform a manner as possible between the individual sheet metal layers of the stack even in the region in which contact is made or it is even necessary to do so in order to prevent damage.

The embodiments known in the prior art therefore typically include current distribution structures at which the individual sheet metal layers of the stack end, wherein a connection pin which is routed through the metal casing of the honeycomb body in an electrically insulated manner in turn makes contact with the current distribution structure. The current distribution structure which is typical in the described construction is a kind of half-shell which runs parallel to the metal casing and at which individual sheet metal layers end and are metallically connected, in particular brazed. The current distribution structure in turn has to be electrically insulated from the metal casing of the honeycomb body by an insulating layer. That can be achieved by an air gap, but for that purpose it is necessary for the current distribution structure to likewise be stabilized in its position, which is preferably performed by additional supporting pins, wherein it is also necessary to always ensure in that case that the structures at which support takes place are electrically insulated.

The problem of making electrical contact arises in an electrically heatable honeycomb body at least on one side of the stack, specifically when the other side of the stack can be or is intended to be connected directly to the metal casing. If both ends of the stack are not intended to be connected to (electrical) ground, contact also has to be made in a corresponding manner with both ends of the stack.

SUMMARY OF THE INVENTION

It is accordingly an object of the invention to provide an electrically heatable honeycomb body assembly having an electrical connection of a plurality of sheet metal layers, which overcomes the hereinafore-mentioned disadvantages and at least partially solves the highlighted problems of the heretofore-known assemblies of this general type. The aim, in particular, is to provide an electrical connection of a plurality of sheet metal layers of a honeycomb body to a connection pin, in which this connection is established in a simple and cost-effective manner, largely avoiding a current distribution structure parallel to the metal casing and, in spite of this, allowing uniform distribution of the current and a stable structure of an electrically heatable honeycomb body.

With the foregoing and other objects in view there is provided, in accordance with the invention, an electrical connection of a plurality of sheet metal layers of a honeycomb body to a connection pin, wherein the honeycomb body has a metal casing with an inner circumference or periphery through which the connection pin is routed in an electrically insulated manner in a bushing. Provision is further made for the sheet metal layers to be alternately disposed coarsely structured sheet metal layers and finely structured or smooth sheet metal layers, which sheet metal layers together form a stack with an uppermost sheet metal layer and a lowermost sheet metal layer, which stack has channels, through which a gas can flow from an inlet side to an outlet side in an axial direction, between the sheet metal layers. In addition, the connection pin runs (approximately) perpendicular to the sheet metal layers, and therefore in a radial direction, and is metallically connected to at least two of the sheet metal layers, preferably to at least half of the sheet metal layers, in particular to all of the sheet metal layers, by using at least one electrically conductive intermediate piece which surrounds a plurality of sheet metal layers of the stack.

Although it appears difficult to connect a relatively thick connection pin to a plurality of relatively thin sheet metal layers, which can additionally also be further structured, it has been found that a connection of two or more sheet metal layers, which are situated one on the other and/or are squeezed together, by using an intermediate piece, which (at least partially) surrounds the sheet metal layers, is not only possible but even leads to the stack being held in a very stable manner. This in turn also allows an air gap to be formed in a stable manner between the stack and the metal casing, without additional stabilizing structures such as half-shells or current distribution structures being required.

The intermediate piece is in (direct) electrical contact both with the connection pin and also with the sheet metal layers with which contact is made. The intermediate piece is, in particular, a single-piece metal sheet. It is further preferred that the intermediate piece be constructed in the manner of a clip which is in electrical contact with the connection pin on an outer side and with the sheet metal layers on an inner side. "Surrounding" results, in particular, when the intermediate piece bears against the stack on two sides and preferably on three sides (outer side, inner side, front end, rear end, circumferential termination side of the stack).

In accordance with another preferred feature of the invention, the uppermost sheet metal layer in the stack runs (approximately) parallel to the metal casing even over at least 35%, preferably over at least 40%, of the length of the inner circumference or periphery, and is separated from the metal casing only by an air gap. When the honeycomb body is viewed from its end in the axial direction and is divided into 360° in the circumferential direction, the uppermost sheet metal layer (the sheet metal layer which is situated furthest radially outward) therefore preferably runs parallel to the metal casing over an angular range of at most 180°, at least however at least (approximately) 144°, depending on the precise shaping of the connection region and the course of the stack into the interior of the honeycomb body.

In accordance with a further preferred feature of the invention, the uppermost sheet metal layer, and preferably also the lowermost sheet metal layer, of the stack is a finely structured sheet metal layer or a smooth sheet metal layer. This is particularly advantageous because the uppermost sheet metal layer and also the lowermost sheet metal layer of the stack are preferably metallically connected to the intermediate piece, as a result of which the remaining sheet metal layers are virtually surrounded and their ends, even if they themselves cannot be connected to the intermediate piece, are not able to move and therefore cannot cause any electrical shorts.

In accordance with an added feature of the invention, the functioning of the uppermost and/or of the lowermost sheet metal layer can be assisted by one or both having, at least in subregions, a thickened portion and/or being thicker than further, or the remaining, sheet metal layers of the stack. In particular, the thicker subregions can have a sheet metal thickness of from 80 to 200 μm [micrometers], particularly preferably of from 110 to 170 μm, while the further sheet metal layers or the remaining sheet metal layers have, for example, a thickness of 20 to 60 μm [micrometers]. A greater thickness can be achieved either by thicker metal sheets being used in the desired subregion and/or by the uppermost or the lowermost sheet metal layer in the subregion in question being composed of a plurality of, for example two or three, sheet metal layers which are situated one on the other and may be jointly structured.

In this case, the lowermost sheet metal layer can have a thickened portion and/or be thicker than the remaining sheet metal layers at least in a connection region and along a portion of the stack. Making the two outer sheet metal layers thicker simplifies the metallic connection to the intermediate piece, in particular when the methods of resistance welding or brazing are used.

At least the uppermost sheet metal layer is preferably composed of a steel containing nickel, chromium and iron, which is also known by the name NiCroFer. The mechanical and electrical properties, in particular the good electrical conductivity and high-temperature corrosion resistance of this material, make it particularly suitable for the demands made of the uppermost sheet metal layer.

In order to achieve uniform current distribution in the stack, it is particularly preferred to connect all of the sheet metal layers to the intermediate piece, wherein, to this end, the sheet metal layers are either compressed, in order to smooth an existing structure, and/or are surrounded by the intermediate piece in unchanged form.

In accordance with an additional feature of the invention, experiments have shown that particularly stable constructions are produced when the coarsely structured sheet metal layers and finely structured sheet metal layers are each corrugated, wherein a second corrugation height of the coarsely structured metal sheets is greater than a first corrugation height of the finely structured metal sheets, specifically by a factor of from 3 to 10, preferably of from 4 to 6. It has been found that this type of structuring is advantageous from various points of view. The incorporation of supporting pins is simplified by all of the sheet metal layers having a certain degree of elasticity, which has hardly any effect on the electrically conductive connection to an intermediate piece.

In accordance with yet another feature of the invention, when corrugated/structured sheet metal layers are used for all of the sheet metal layers of the stack, it is also advantageous if the coarsely structured sheet metal layers have a second corrugation length which is greater than a first corrugation length of the finely structured sheet metal layers, specifically at least by a factor of 1.5 for example. Technically judicious limits have to be complied with when selecting corrugation heights and corrugation lengths for the coarsely structured sheet metal layers and finely structured sheet metal layers. In particular, the ratios and corrugation shapes are selected in such a way that, as far as possible, no channels with a very small cross section which can possibly become blocked during coating are produced.

The intermediate piece is preferably metallically connected to, for example, 2 to 5 sheet metal layers of the stack over an area of at least 10 mm² [square millimeters], wherein the intermediate piece is spaced apart from the inner circumference of the metal casing by, for example, from 3 to 8 mm [millimeters], preferably by from 4 to 6 millimeters. In this way, the electrical connection can introduce the required electrical currents into the stack in a uniform manner and at the same time stabilize the stack at a sufficient distance from the metal casing, so that electrical insulation between the stack and the metal casing is ensured by an air gap.

For this honeycomb body too, a preferred shape is an intertwining of the stack in the opposite direction in the shape of an S, wherein the turns of the stack are electrically insulated from one another by air gaps. This embodiment is known per se but, due to the mechanical movements of the sheet metal layers which occur in the event of severe changes in temperature, it has not been able to be constructed to date without current distribution structures in the shape of half-shells. This becomes possible only with the intermediate piece proposed by the present invention.

In this case, specifically the uppermost sheet metal layer of the stack has particular functions. In the case of an S-shaped construction, the uppermost sheet metal layer forms the boundary between the insulating air gap and the metal casing over virtually half the inner circumference, with the uppermost sheet metal layer serving to establish the electrical connection to the intermediate piece and bounding the inner sheet metal layers. When the uppermost sheet metal layer has a thickened portion or is thicker than the other sheet metal layers, it has proven advantageous if this is the case only over a portion of the length of the stack, preferably up to approximately the center of the honeycomb body. It has been found that, in this subregion of the stack, the uppermost sheet metal layer can at the same time serve to distribute the electric current in the stack. The current always searches for the shortest path and that of the lowest resistance, and therefore it tends to flow to the inner region of the stack, which is compensated for by a thicker uppermost sheet metal layer. In the central region of the honeycomb body however, the uppermost sheet metal layer becomes the lowermost sheet metal layer due to the stack being intertwined in the opposite direction, and therefore it is advantageous to allow the sheet metal layers to terminate there at the latest or for a thinner layer to continue from there. This can be performed, for example, at one of the points at which the intertwining also changes direction.

In accordance with yet a further feature of the invention, in order to stabilize the connection region, it is particularly preferred to stabilize the shape of the stack by virtue of a multiplicity of supporting pins, wherein at least one supporting pin is disposed at a distance of less than 10 cm [centimeters], preferably less than 5 cm, particularly preferably less than 2 cm, from the connection pin as measured along the course of the stack. This configuration serves, in particular, to stabilize the air gap with respect to the metal casing. At least one further connection pin at a similar distance can be provided in order to keep stable an end of the stack which projects out of the intermediate piece.

In accordance with yet a very particularly preferred added feature of the invention, the intermediate piece extends at least as far as the inlet side and/or the outlet side of the stack and at least partially surrounds at least one of the sides. Although at least some channels are blocked or covered as a result, the number of the channels which are blocked or covered is negligible with respect to the total number of channels of the honeycomb body. However, in turn, the ability to make contact with the sheet metal layers is improved and it is no longer absolutely necessary to deform the cross section of the stack in the region of the intermediate piece. The intermediate piece forms a kind of clip around at least a portion of the stack and in the process runs partially (parallel) in front of the inlet side and/or (parallel) behind the outlet side, where there is enough space.

In accordance with yet an additional feature of the invention, as an alternative or in addition, the intermediate piece can surround the stack at one end (circumferential termination side). The shape of the intermediate piece is preferably matched to the shape of the cross-sectional area and/or the shape of the longitudinal sectional area of the end of the stack.

In accordance with again another feature of the invention, in this case, the intermediate piece is preferably in direct contact with a plurality of or all of the sheet metal layers of the stack by virtue of the sheet metal layers butting against the intermediate piece, in particular being brazed to the intermediate piece, on the inlet side and/or the outlet side.

In accordance with again a further preferred feature of the invention, the cross-sectional area of the stack in the region of the intermediate piece has (substantially) the same shape and size as in the remaining course of the stack, in particular a rectangular shape.

In accordance with again an added feature of the invention, in this case, the end of the stack can taper outside the intermediate piece and, in particular, extend in the form of a curved wedge, so that it is well-matched to the rest of the shape of the honeycomb body. An end of the stack which projects beyond the intermediate piece leads, during operation, to additional cooling of the connection region.

The implementation of the electrical connection in the electrically heatable honeycomb body according to the invention allows a simplified construction and cost-effective production, which is important, in particular, for series production in the automobile sector.

The invention is used, in particular, in a motor vehicle having an internal combustion engine and an electrically heatable honeycomb body which is integrated in the exhaust-gas system.

Other features which are considered as characteristic for the invention are set forth in the appended claims, noting that advantageous embodiments described in the claims can be combined with one another in a technically meaningful manner.

Although the invention is illustrated and described herein as embodied in an electrically heatable honeycomb body assembly having an electrical connection of a plurality of sheet metal layers, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
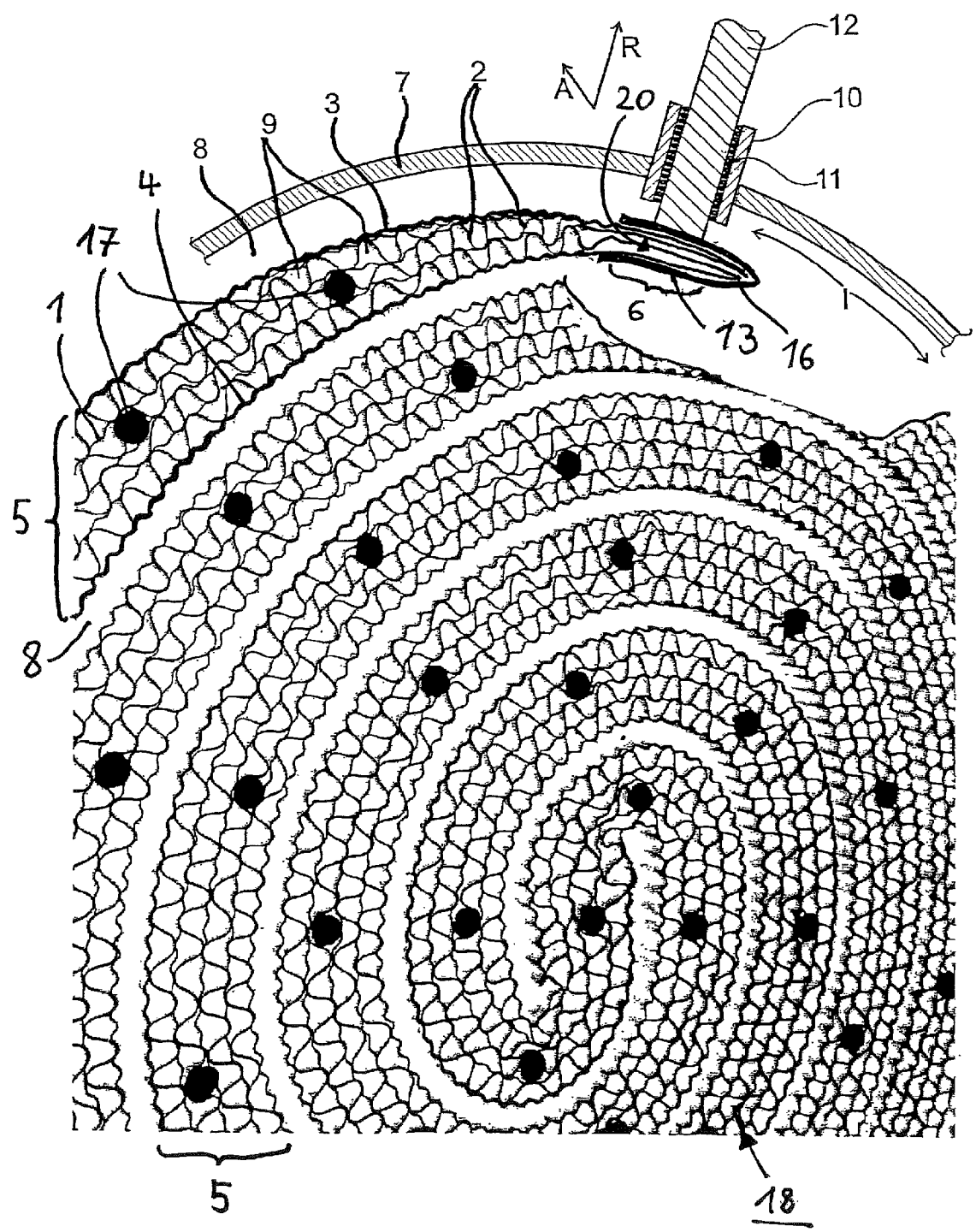
FIG. 1 is a fragmentary, diagrammatic, cross-sectional view through the region of an electrical connection of an electrically heatable honeycomb body.

Referring now to the figures of the drawings in detail and first, particularly, to FIG. 1 thereof, there is seen a diagrammatic illustration of a subregion of an electrically heatable honeycomb body 18 which is disposed in a metal casing 7. The honeycomb body 18 contains a stack 5 including smooth or finely structured sheet metal layers 1 alternately disposed with corrugated or coarsely structured sheet metal layers 2. The stack 5 has an uppermost sheet metal layer 3 and a lowermost sheet metal layer 4. The uppermost sheet metal layer 3 is separated from the metal casing by an air gap 8. The sheet metal layers are both finely structured in the present exemplary embodiment. At least some of the sheet metal layers 1, 2, 3, 4 end in an intermediate piece 13 to which they are electrically conductively connected and which, for its part, is electrically conductively connected to a connection pin 12. Possible connection techniques include, for example, resistance welding and/or hard-soldering or brazing. The connection pin 12 is routed through a bushing 10 passing through the metal casing 7 and insulated from the metal casing by an electrical insulating layer 11. The connection pin 12 runs in a radial direction R, as is indicated by an arrow. The coarse and finely structured sheet metal layers together form channels 9 which run in an axial direction A that is likewise indicated by an arrow. The metal casing 7 has an inner circumference or periphery I which is likewise indicated by arrows. At least the uppermost sheet metal layer 3 and the lowermost sheet metal layer 4 and also preferably further sheet metal layers 1, 2, are electrically conductively connected to the intermediate piece 13 and, by using the intermediate piece, to the connection pin 12. The stack 5 is stabilized by supporting pins 17 which can possibly be supported on an adjacent further honeycomb body that is not illustrated herein. Also indicated is the manner in which the intermediate piece 13 surrounds an end 16 of the stack 5, in such a way that an inner shape of the intermediate piece is then matched to a longitudinal sectional area 20 of the end 16 of the stack or, conversely, for example is in the shape of a curved wedge.

Figure 2:
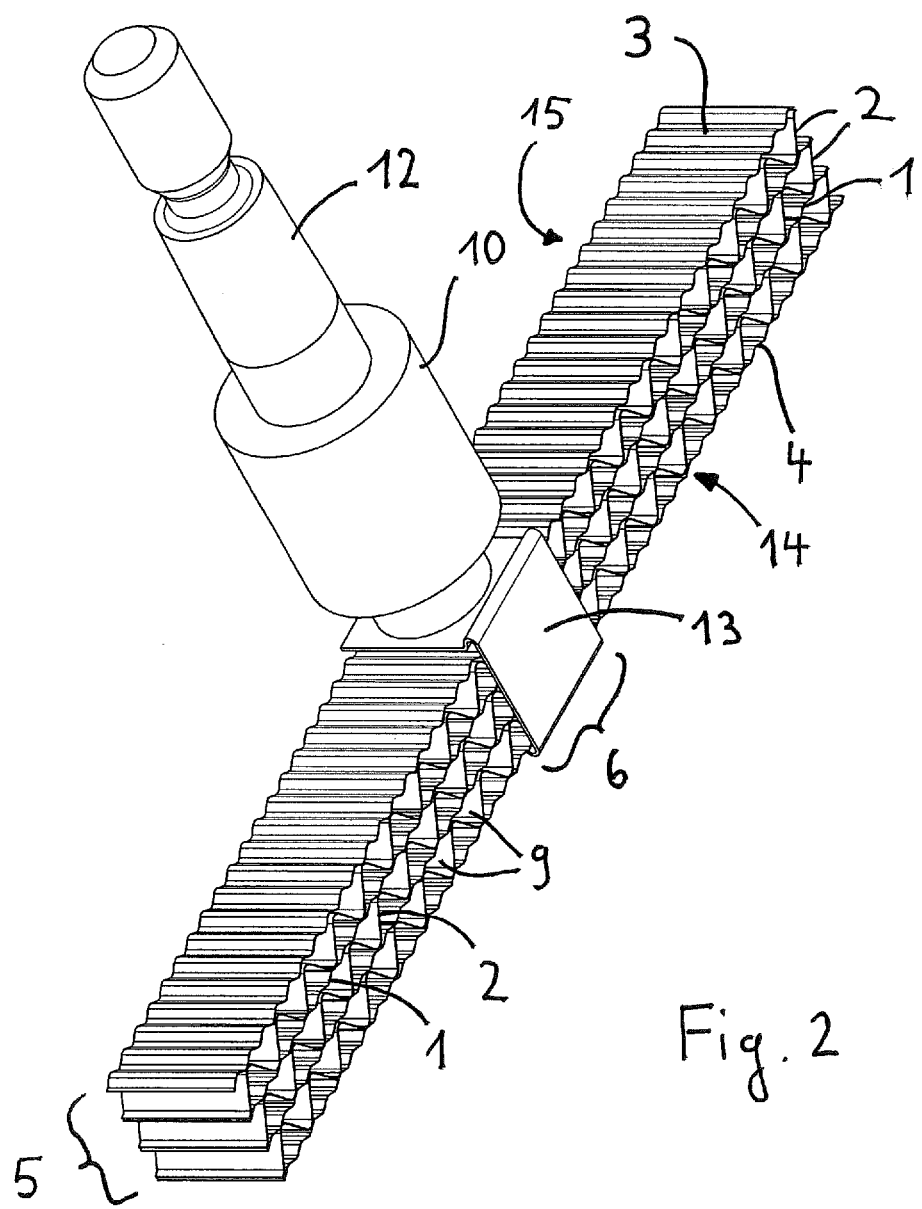
FIG. 2 is a perspective view of an embodiment of an intermediate piece which laterally surrounds a sheet metal stack.

FIG. 2 diagrammatically shows how a stack 5 of sheet metal layers 1, 2, 3, 4 is laterally surrounded by an intermediate piece 13. In this case, the intermediate piece 13 is in the shape of a clip, in the present case a clip with an approximately rectangular inner cross section, and makes direct contact with the uppermost sheet metal layer 3 and the lowermost sheet metal layer 4 and also with the ends of the remaining sheet metal layers 1, 2 on an inlet side 14 which is opposite an outlet side 15. In this way, current can be uniformly introduced without deformation of the stack 5.

Figure 3:
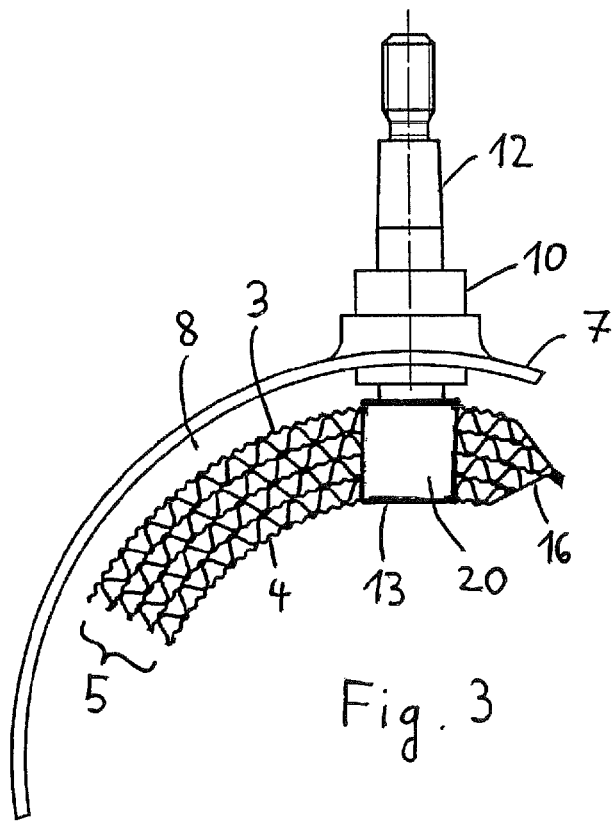
FIG. 3 is a fragmentary, cross-sectional view of a further exemplary embodiment of an electrical connection with an intermediate piece as seen from one end.

FIG. 3 diagrammatically shows the manner in which a connection region 6 of a stack 5 is configured from finely structured sheet metal layers 1 and coarsely structured sheet metal layers 2 in another embodiment. A connection pin 12, which in turn is insulated from a bushing 10 passing through a metal casing by using a non-illustrated electrical insulating layer 11, ends with its connection end against an intermediate piece 13 and is electrically conductively connected, preferably welded or brazed, to the intermediate piece and possibly to ends of the sheet metal layers 1, 2 which are situated beneath the intermediate piece. In the present exemplary embodiment, the intermediate piece 13 surrounds the end of the stack 5 in the connection region 6. The precise configuration of the connection region 6 (seen in FIG. 1), similarly to the manner described above, is possible in various embodiments. All of the sheet metal layers can preferably be pressed together ever more strongly or be constructed with an ever smaller corrugation height, in order to achieve the desired tapering shape. A supporting pin 17 can in turn stabilize the entire configuration.

Figure 4:
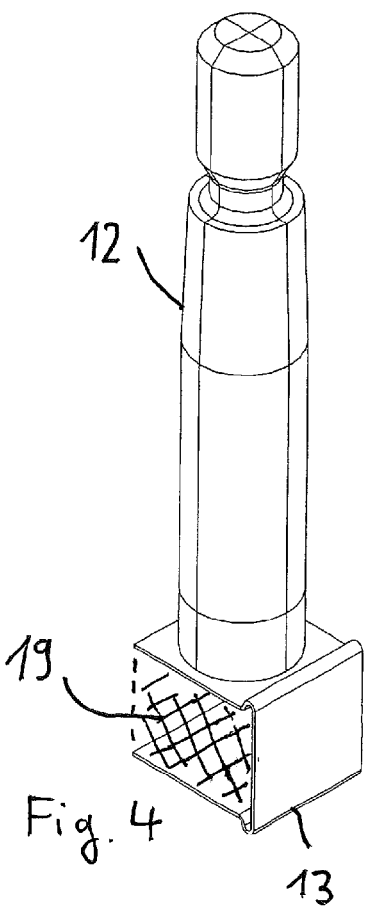
FIG. 4 is a perspective view of a particular embodiment of a connection pin with an intermediate piece.

FIG. 4 diagrammatically shows, in a perspective illustration, an embodiment of the connection pin 12 with an intermediate piece 13 according to the invention. The non-illustrated stack 5 has a cross-sectional area 19 which can be surrounded by the intermediate piece and is indicated by hatching. In a similar manner, an intermediate piece, as indicated in FIG. 1, can also surround an end 16 of the stack 5, with the inner shape of the intermediate piece then being matched to the longitudinal sectional area 20 of the end 16 of the stack, for example in the shape of a curved wedge.

Figure 5:
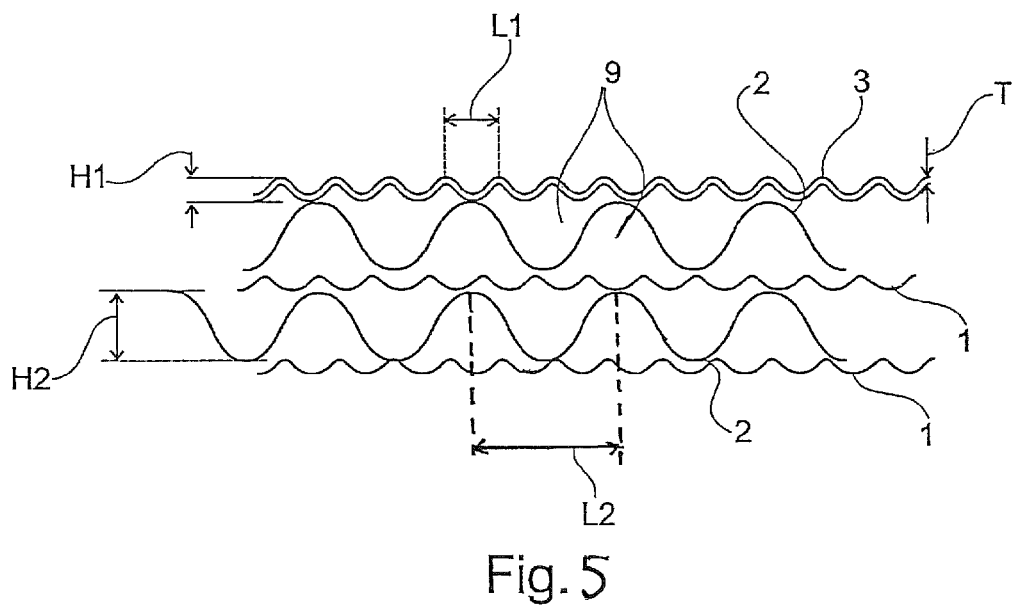
FIG. 5 is a side-elevational view of structured sheet metal layers.

FIG. 5 illustrates the relative sizes of the structures and corrugations of the sheet metal layers 1, 2, 3, 4. The finely structured sheet metal layers 1 in the stack have a first corrugation with a first corrugation height H1 and a first corrugation length L1 which (in this case) are each smaller than a second corrugation height H2 and a second corrugation length L2 of a second corrugation of the coarsely structured metal sheets 2. The uppermost sheet metal layer 3 can furthermore have a greater thickness T than the remaining sheet metal layers 1, 2 of the stack 5.

By way of precaution, it should also be noted that the combinations of technical features shown in the figures are not generally binding. For example, technical features from one figure may be combined with other technical features from a further figure and/or from the general description. The only exception to this is if the combination of features has been explicitly referred to herein and/or a person skilled in the art identifies that the basic functions of the apparatus can no longer be realized otherwise.

The present invention permits the cost-effective production of a simple structure of an electrically heatable honeycomb body which allows highly uniform current distribution, and therefore heating, even without current distribution structures or supporting half-shells in the outer region.

The invention claimed is:

1. A honeycomb body assembly, comprising:
    a honeycomb body having a metal casing with an inner periphery, a radial direction, an axial direction and a bushing passing through said metal casing;
    alternately disposed coarsely structured sheet metal layers and finely structured or smooth sheet metal layers together forming a stack with an uppermost sheet metal layer, a lowermost sheet metal layer, an inlet side, an outlet side, a connection region and channels between said sheet metal layers through which a gas can flow from said inlet side to said outlet side in said axial direction;
    a connection pin running perpendicular to said sheet metal layers in said radial direction and passing through said inner periphery in said bushing in an electrically insulating manner; and at least one electrically conductive intermediate piece surrounding a plurality of said sheet metal layers in said connection region and providing a metallic electrical connection of said connection pin to at least two of said sheet metal layers.

2. The honeycomb body assembly according to claim 1, wherein said uppermost sheet metal layer in said stack runs parallel to said metal casing over at least 35% of said inner periphery and is separated from said metal casing only by an air gap.

3. The honeycomb body assembly according to claim 1, wherein said inner periphery has a length, and said uppermost sheet metal layer in said stack runs parallel to said metal casing over at least 40% of said length of said inner periphery.

4. The honeycomb body assembly according to claim 1, wherein said uppermost sheet metal layer of said stack is finely structured or smooth.

5. The honeycomb body assembly according to claim 1, wherein at least said uppermost sheet metal layer or said lowermost sheet metal layer has a thickened portion or is thicker than further sheet metal layers of said stack at least in subregions.

6. The honeycomb body assembly according to claim 1, wherein said coarsely structured sheet metal layers and said finely structured sheet metal layers are each corrugated, said finely structured sheet metal layers have a first corrugation height, said coarsely structured sheet metal layers have a second corrugation height, and said second corrugation height is greater than said first corrugation height.

7. The honeycomb body assembly according to claim 1, wherein said coarsely structured sheet metal layers and said finely structured sheet metal layers are corrugated, said finely structured sheet metal layers have a first corrugation length, said coarsely structured sheet metal layers have a second corrugation length, and said second corrugation length is greater than said first corrugation length.

8. The honeycomb body assembly according to claim 1, which further comprises a multiplicity of supporting pins stabilizing a shape of said stack, at least one of said supporting pins being disposed at a distance of less than 10 cm from said connection pin as measured along a course of said stack.

9. The honeycomb body assembly according to claim 1, wherein said at least one intermediate piece extends at least up to said inlet side or to said outlet side of said stack and at least partially surrounds at least said inlet side or said outlet side.

10. The honeycomb body assembly according to claim 1, wherein said at least one intermediate piece surrounds said stack around one end of said stack.

11. The honeycomb body assembly according to claim 1, wherein said stack has an end having a cross-sectional area with a shape and a longitudinal sectional area with a shape, and said at least one intermediate piece has a shape matched at least to said shape of said cross-sectional area or to said shape of said longitudinal sectional area.

12. The honeycomb body assembly according to claim 1, wherein said sheet metal layers butt against said at least one intermediate piece at least on said inlet side or said outlet side, placing said at least one intermediate piece in direct contact with a plurality of or all of said sheet metal layers of said stack.

13. The honeycomb body assembly according to claim 1, wherein said stack has a cross-sectional area in the vicinity of said at least one intermediate piece and a remaining course having the same shape and size.

14. The honeycomb body assembly according to claim 1, wherein said stack has an end tapering outside said at least one intermediate piece.

* * * * *